Figure 1:
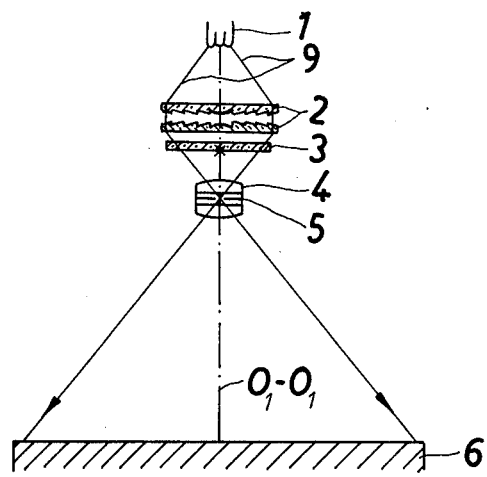

United States Patent [19]

de la Croix et al.

[11] 4,012,136
[45] Mar. 15, 1977

[54] PROJECTION DEVICE FOR PHOTOGRAMMETRICAL PURPOSES

[75] Inventors: Harald de la Croix, Weimar; Wilfried Müller, Jena, both of Germany

[73] Assignee: Jenoptik Jena G.m.b.H., Jena, Germany

[22] Filed: Feb. 5, 1975

[21] Appl. No.: 547,752

[30] Foreign Application Priority Data

Mar. 5, 1974 Germany .................. 176944

[52] U.S. Cl. .................. 353/102; 353/38
[51] Int. Cl.$^2$ .................. G03B 21/20; G03B 21/14
[58] Field of Search .......... 353/38, 63, 102, 122; 350/6, 160 R, 211, 273, 275, 285; 240/2 M, 2 AT, 2 C, 3.1, 9.5, 92, 93, 103 R, 106 R, 106.1; 355/66, 67

[56] References Cited

UNITED STATES PATENTS

| | | | |
|---|---|---|---|
| 2,804,802 | 9/1957 | Loeck | 350/44 X |
| 3,334,958 | 8/1967 | Appeldorn | 350/211 |
| 3,340,765 | 9/1967 | Herriott | 350/211 X |
| 3,366,006 | 1/1968 | Saila | 353/84 X |
| 3,511,563 | 5/1970 | Erwin | 350/211 X |

OTHER PUBLICATIONS

IBM Technical Disclosure Bulletin, vol. 3, No. 1, June, 1960, p. 1, "Display Equipment Lighting" by J. V. Collins.

*Primary Examiner*—Harry N. Haroian
*Attorney, Agent, or Firm*—Nolte and Nolte

[57] ABSTRACT

A projecting device, particularly for use in photogrammetry, employs a Fresnel condensor for illuminating a picture carrier which is imaged through an objective, including a diaphragm, onto a projection table. At least half of the illumination rays entering said objective, is suppressed by said diaphragm. The Fresnel condensor and the severe stopping-down of the objective produce interfering chromatical effects on the projection table. Said chromatical effects are eliminated either by means of a bi- or multifocal embodiment of the Fresnel lens or by insertion of optical means which extend the optical illumination path or by a respective embodiment of the light source.

6 Claims, 10 Drawing Figures

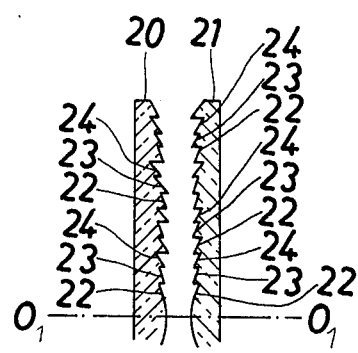
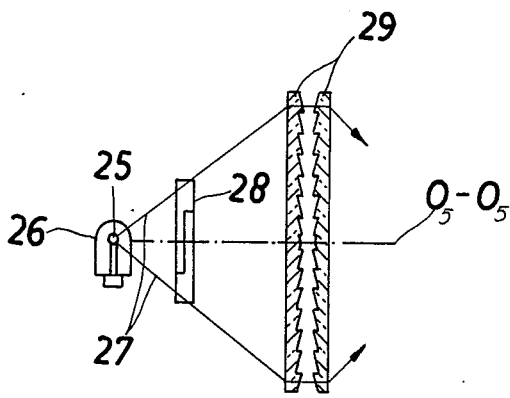
Fig. 4        Fig. 5
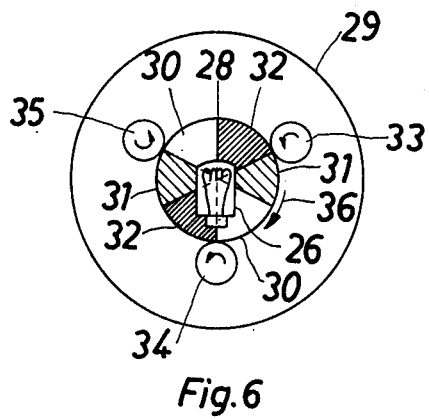
Fig. 6
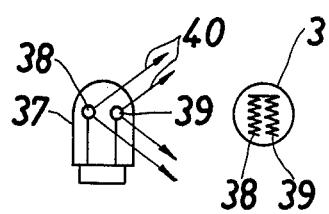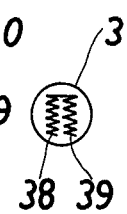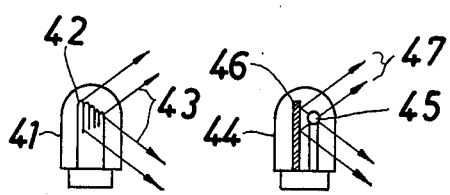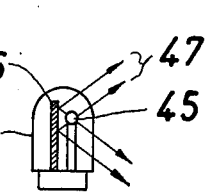
Fig. 7    Fig. 8    Fig. 9    Fig. 10

PROJECTION DEVICE FOR PHOTOGRAMMETRICAL PURPOSES

The invention is in concern of a projection device having a wide angular field of the lens, particularly for use in photogrammetry, in which substantially white light and a Fresnel condensor are employed for illuminating a picture-carrier, which is imaged onto a projection table by means of an objective including a diaphragm for suppression of at least half the illumination rays, which enters the objective, and in which the light source produces colored images, corresponding to the shades of monochromatic light, at least in the vicinity of the diaphragm parallel to the diaphragm plane.

Due to their compactness and low weight, their low consumption of material during an easy manufacturing process particularly with large-sized lenses, two Fresnel lenses are used as condensors with advantage compared to spherical or a-spherical condensor lenses, to illuminate diapositives or film negatives.

Some applications in photogrammetry require a considerable stopping down of a projection objective aperture to effect a higher definition in depth in the course of a stereoscopic evaluation of the heights in a supervised area. On the other hand, an optimum brightness of the projection image will result from entirely imaging the coil of the projection light source into the lowest diaphragm aperture of the projection objective. Due to the refractive dispersion at the Fresnel lenses of the condensor, it is not feasible to sharply image the lamp coil into the diaphragm plane of the projection objective at all of the employed wavelengths. When the two Fresnel lenses of the condensor are manufactured substantially of the same material, a correction for chromatical aberration is not feasible. The colors of a projected image, which can be considerably interfering, depend on the wavelengths at which the Fresnel condensor is focussed with respect to the projection objective.

It is an object of the present invention to obviate the aforementioned disadvantages.

It is a further object of the present invention to provide a projection device for photogrammetrical purposes, which eliminates the chromatical aberration in a projected image, caused by a Fresnel condensor, and which ensures a sharp focussing of a projected image at a wide depth of definition range.

Accordingly the invention is concerned with a projection device having a wide angular field of lens, particularly for use in photogrammetry, in which optical means are arranged in the illumination path of rays in front of the diaphragm, said means at least temporarily cause a superposition of the color images of the light source in the plane of the diaphragm. Said means can be arranged separately from the aforementioned components in the illumination path of rays, or, by a corresponding embodiment of the condensor and light source, respectively, can be integral with said components. Anyhow, said means ensures a projected image, which is free from chromatical aberration, which is of particularly important when color photos are concerned. With an advantageous embodiment the Fresnel condensor consists of two Fresnel lenses, the faces of which, carrying the echelon structure, are oppositely located and one of said Fresnel lenses possesses at least two foci.

The different foci are obtained by respective inclinations of the subsequent active faces of the echelon structures.

Alternatively, an optical means is provided in the illumination path of rays in front of the condensor, to extend the optical path, and which moves alternatingly at a frequency of at least 24 Hz in the path of rays.

Such optical means can be, for example, transparent plano-parallel plates.

The same effect of an extension of the optical path between the light source and the diaphragm plane in the projection objective may be obtained by an oscillating axial movement of the light source.

With a further preferable embodiment the coil of the light source is arranged in accordance with the chromatical aberration in parallel with the optical axis of the condensor.

With still another embodiment the light source includes at least two coils, which are sequentially arranged substantially at right angles to the optical axis. And finally it is advantageous to locate a reflector in the light source socket or externally thereof. Said reflector being in the rear of the light source produces an image of the coil in the vicinity of the coil and thus a second identically arranged light source, the distance of which to the first light source is defined by the chromatical aberration, to be eliminated, in the vicinity of the diaphragm of the projection objective.

Figure 2:
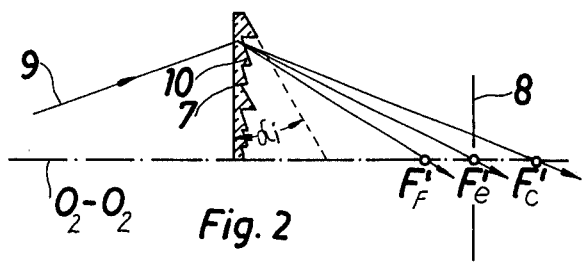
Figure 3:
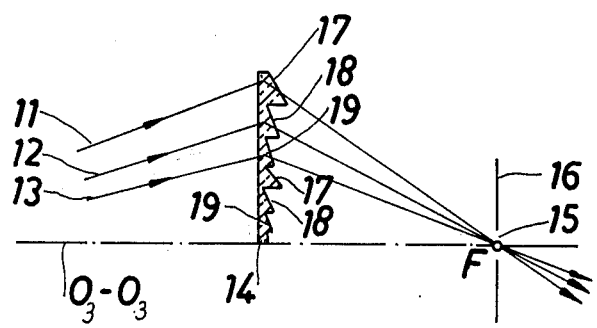

In order that the invention may be more readily understood reference is made to the accompanying drawings which illustrate diagrammatically and by way of example five embodiments thereof, and in which:

FIG. 1 shows a schematical elevation view of the essential parts of a projection device according to the invention, FIG. 2 an axial sectional view of a Fresnel condensor in order to explain its operation, FIG. 3 is an axial sectional view of a Fresnel condensor in order to explain the operation of three subsequent active flanks thereof, FIG. 4 shows an axial sectional view of a part of a two lens condensor, FIG. 5 represents a sectional elevation view of the essential parts of a second embodiment of the invention, FIG. 6 is a side view of the second embodiment of FIG. 5, FIG. 7 shows an elevation view of a light source, FIG. 8 is a top view of the light source of FIG. 7, FIG. 9 an elevation view of a light source having a conical coil, FIG. 10 an elevation view of a light source including a reflector.

In FIG. 1 a diapositive 3 is located in the object plane of an objective 4 which has an optical axis $0_1$—$0_1$. Said diapositive 3 is illuminated by a light source emitting white light through a Fresnel condensor 2 which comprises two members. The light source is represented by a coil 1. The objective 4 is provided with a diaphragm 5 and has a projection table 6 in its image side plane. The image side plane and object side plane are optically conjugated.

The Fresnel condensor 2 images the coil 1 onto the aperture of the diaphragm 5. The diapositive 3 is imaged by said objective 4 onto the projection table 6.

Because the different color components of the white light are differently refracted at the Fresnel condensor 2, the white light emitted by the coil 1 is decomposed and the individual monochromatical light components are collected in different foci on the optical axis of the Fresnel condensor 2. Said matter is represented in more detail in FIG. 2, which, for the sake of more simplicity, shows a Fresnel condensor comprising only one Fresnel lens 7, which has an optical axis $0_2$—$0_2$ and an allocated diaphragm 8. A bundle of light 9 impinges upon a ring 10 of said Fresnel lens 7, which splits up the light into the color components, the foci of which are successively located on the optical axis $0_2$—$0_2$. The foci $F_F'$, $F_d'$, $F_C'$, corresponding to the color components blue, yellow and red are represented in the drawing. The foci $F_F'$, $F_d'$, $F_C'$ (FIG. 2) are optically conjugated to coil 1 (FIG. 1).

A superposition of said three color components will yield white light. Therefore, the three bundles of light 11, 12, 13 are represented in FIG. 3 in such a manner that the blue-component of the light bundle 11, the yellow-component of light bundle 12 and the red-component of the light bundle 12 unite in a point F', which lies in the aperture 15 of the diaphragm 16, after having passed the Fresnel lens 14 which has an optical axis $0_3$—$0_3$. Such an effect is obtained in that three successive active flanks 17, 18, 19 of the Fresnel lens 14 are provided with respective inclinations $\alpha_{Ci}$; $\alpha_{di}$; $\alpha_{Fi}$.

Taking under consideration the radius $r_i$ of the respective Fresnel ring about the optical axis $0_3$—$0_3$, the distances from the diaphragm 16 to the Fresnel lens 14, and the deflection $\delta_i$ effected of the active flanks, the inclination $\alpha_{Ci}$ is calculated from an equation $$\frac{\sin(\alpha_{Ci} + \delta_i)}{\sin \alpha_{Ci}} = n_C \qquad (I)$$

and the inclinations $\alpha_{di}$ and $\alpha_{Fi}$ from analogous equations. The deflection $\delta_i$ is defined by the equation $$\tan \delta_i = r_i/s \qquad II$$

FIG. 4 shows a part of the condensor 2 of FIG. 1. Said condensor has an optical axis $0_1$—$0_1$.

The echelon structures on the identical Fresnel lenses 20, 21 are oppositely located. The active flanks 22, 23, 24 on each Fresnel lens are arranged in successive units of three which for reasons of more simplicity are only partially designated on the Fresnel lenses 20 and 21, respectively.

When the material of both Fresnel lenses 20, 21 is selected from identical transparent synthetics having a refractive index $n_d$ = 1.49 and an Abbe number $\nu_d$ = 55, and when the refractive indices $n_F$ = 1.945 and $n_c$ = 1.4855 are defined by the relation $$\nu_d = \frac{n_d - 1}{n_F - n_C}, \qquad (III)$$

at an image distance $s$ = 170 mm and a feasible deflection $\delta_i$ = 45°, then the inclination of the active flanks will yield $\alpha_C$ = 42.3°; $\alpha_d$ = 42.1°; $\alpha_F$ = 41.9 for the unit of three, in which the radius of the central ring of a unit of three 22, 23, 24 is $r$ = 170 mm and the width of an individual ring amounts to from 0.1 to 0.2 mm.

At such parameters the foci of the Fresnel lenses 20, 21, namely the focus $F_C'$ of the red light passing the active flank 34, $F_d'$ of the yellow light passing the active flank 23, and $F_F'$ of the blue light passing the active flank 22, coincide with the focus F' in the aperture of the diaphragm 15 (FIG. 3), in which the mean distance of the unit of three from the optical axis $0_1$—$0_1$ amounts to $r$ = 170 mm.

With a decrease of the radius the inclination $\alpha_i$ of the flanks and the deflection angles $\delta_i$ will likewise decrease.

In FIGS. 1 to 4, each Fresnel lens is coordinated to three foci, by correspondingly shaping the lens.

The active flanks can be combined to groups of from two (at a minimum) to seven (number of the important colors for composing white light), in which the inclination of the flanks represents a group criterion.

Accordingly, each Fresnel lens will have two to seven foci, which are such related that the focus of a selected color component of the white light, which passes an active flank, lies at the same place on the optical axis as the foci of the remaining color components of the white light which pass the active flanks of the same group.

FIGS. 5 and 6 represent another embodiment for producing white light of optimum light intensity in the aperture of the diaphragm 5 (FIG. 1).

A coil 25 of a light source 26 emits a diverging bundle of white light 27, which after passage through a sector disc 28 arrives at a mono-focal Fresnel condensor 29 having an optical axis $0_5$—$0_5$ in an objective (not shown) analogous to FIG. 1. The sector disc 28 comprises three pairs 30, 31, 32 of different glass thicknesses and rotates about the optical axis $0_5$—$0_5$ in the direction indicated by an arrow 36, driven by three synchronously operating drive means 33, 34, 35.

The glass thickness d of the sector pair 30 is 10 mm, of the sector pair 31, 16.5 mm and of the sector pair 32, 33 mm, in which the refractive index of the respective glass is $n$ = 1.5 mm, the mean distance difference $\Delta s$ is 11 mm between the focal planes of the extreme colors at the not represented diaphragm. The glass thickness is calculated from the equation $$d = \Delta s \frac{n}{n-1}. \qquad (IV)$$

The equation
$$s + \Delta s = s \cdot \cot \delta_{Ci} \cdot \tan \delta_{Fi} \qquad V.$$

will yield the mean distance difference $\Delta s$ by inversion of $$\Delta s = s \cdot \cot \delta_{Ci} \cdot \tan \delta_{Fi} - s, \qquad VI.$$

in which s, $\delta_{Ci}$, $\delta_{Fi}$ are the aboveidentified magnitudes. The diameter of the sector disc 28 depends on its distance from the light source 26 and may not fall below a certain value, due to the heat radiation of the light source 26.

The disc 28 has to rotate with at least 12 rotations per second in order to eliminate an otherwise occuring flickering white light, when observing a picture on the projection table (6 in FIG. 1). Thus each of the three optical wave-lengths is alternated at least 24 times per second, due to the arrangement of the three sector pairs 30, 31, 32.

It is, however, a condition that the light source operated with alternating current, is slow enough to eliminate otherwise interfering superpositions of the rotation frequency and the a.c. frequency.

The sector disc 28 may only comprise two sector pairs, which are cemented to a transparent carrier means. The sector disc may be replaced by an oscillating optical plano-parallel plate.

In order to keep the oscillations of the amplitude to technically feasible limits, the plate may be provided with stripes of at least two different thicknesses, the intervals of which are equal to the amplitude. When the rotating sector disc 28 coincides with the Fresnel condensor 29, then the Fresnel structures, which would otherwise be visible in the projection are wiped out. With another way of varying the length of the optical path between the light source and the condensor at the amount of the chromatical aberration, the lamp itself oscillates parallel to the optical axis between two extreme positions. Anyway, a rapidly performed periodical variation of the length of the optical path between light source and condensor in the range of the shortest and longest wavelengths of the selected monochromatical components of the white light will yield an illumination of the diaphragm aperture in the projection objective with an intensive light which is free from chromatical aberrations.

When, according to FIG. 2, the right and the left side are interchanged, white light results from an arrangement, in which the images of one coil located at the place of the blue, the yellow, and the red coil images, are transmitted into the aperture of the diaphragm, where they are mixed. In FIGS. 7 and 8, a light source 37 is provided with a twin coil 38, 39.

The coils 38 and 39, respectively, are located at a coil place with respect to the light of the wavelengths $\lambda_C$ and $\lambda_F$, respectively. The space of both coil places depends on the amount of the chromatical aberration of the projection device.

The chromatical aberration can be defined from the focal difference of a lens with respect to a corresponding wavelength. As, in the present case, the focal length is $f \sim (1/n-1)$, where $n$ generally defines the refractive index, the relation between $f_C$ and $f_F$ is expressed as follows $$\frac{f_C}{f_F} = \frac{\frac{1}{n_C - 1}}{\frac{1}{n_F - 1}} = \frac{n_F - 1}{n_C - 1}. \tag{VII}$$

With $n_F = 1.4945$ and $n_C = 1.4855$, as stated above, the result will be $$f_C = 1.02 f_F.$$

At a 1:1 imaging ratio, the sum of the object distance and image distance equals $4f$, thus $f_F$ becomes $f_F = 85$ mm and with the difference $f_C - f_F = 1.7$ mm the chromatical aberration amounts to $4 \cdot 1.7 = 6.8$ mm. Accordingly the distance between the coils 38 and 39 has to be 6.8 mm to eliminate a chromatical aberration.

When the space between coils 38 and 39 is narrow compared to their diameters, it proves to be advantageous to establish a coil 38 of larger diameter than coil 39 has. Alternatively, coil 39 can be provided with larger sized interspaces, when the light is emitted towards the Fresnel condensor, in direction of the arrow 40.

FIG. 9 shows a light source 41 with a conical coil 42 which emits light in direction of an arrow 43 to a not represented condensor.

The top of the coil 42 is directed to the condensor. The conical coil 42 may be replaced by a cylindrical coil.

In FIG. 10 a light source 44, with a coil 45, having a reflector 46 at any suitable place, emits a bundle of light 47 in direction of a not represented condensor. The space between the plane reflector 46 and the light source 45 is so selected as to compensate for chromatical aberration, due to a not represented Fresnel condensor, when producing a light-emitting coil image.

The reflector 46 can be located externally instead of within the light source 44 and can be of an imaging spherical or cylindrical form.

We claim:

1. A projection device of wide angular field of lens, comprising, in sequence along and in alignment with an optical axis, a light source for emitting a bundle of white light symmetrically about said optical axis, a Fresnel condensor, said light source being arranged in the object plane of said Fresnel condensor, said Fresnel condensor including two Fresnel lenses, at least one of said Fresnel lenses having at least two sets of Fresnel flanks each set comprising $n$ flanks, each flank having at least foci $F_1$, $F_2$–$F_n$ for different spectral colors $C_1$, $C_2$–$C_n$, the relative inclinations of said flanks being such that a different one of said foci $F_1$, $F_2$–$F_n$ of each flank is coincident, to constitute said condensor as means producing a substantially achromatic image at said coincident foci, a picture carrier located adjacent to said Fresnel condensor, an objective, said picture carrier being arranged in the object plane of said objective, a diaphragm being provided in said objective and disposed at said coincident foci, said diaphragm passing substantially only light focussed at said coincident foci and being arranged substantially in the image side focal plane of said Fresnel condensor, and a projection table being located in the image plane of said objective, said image plane being optically conjugated to the object plane of said objective.

2. A projection device of wide angular field of lens, comprising in sequence along and in alignment with an optical axis, a light source for emitting a bundle of white light symmetrically about said optical axis, a sector disc for rotation about an axis substantially coincident with said optical axis and having sectors of transparent material of different thicknesses, each producing foci $F_1$, $F_2$–$F_n$ with respect to selected colors $C_1$, $C_2$–$C_n$ of the spectrum of the white light, and constituting means bringing a different one of said foci of each sector to a coincident focus to produce a substantially achromatic image, said sector disc rotating at least at 24 Hz, a Fresnel condensor, said light source being arranged in the object plane of said Fresnel condensor, said Fresnel condensor including two Fresnel lenses, a picture carrier located adjacent to said Fresnel condensor, an objective, said picture carrier being arranged in the object plane of said objective, a diaphragm being provided in said objective and being disposed at said coincident focus, and being arranged substantially in the image side focal plane of said Fresnel condensor, and a projection table being located in the image plane of said objective, said image plane being optically conjugated to the object plane of said objective.

3. A projection device of wide angular field of lens, comprising in sequence along and in alignment with an optical axis, a light source for emitting a bundle of white light symmetrically about said optical axis, said light source having at least two light emitting means arranged substantially at right angles to, spaced apart along and disposed on, said optical axis, a Fresnel condensor, said light source being arranged in the object plane of said Fresnel condensor, said Fresnel condensor including two Fresnel lenses, and producing images $I_1$ and $I_2$ for spectral colors $C_1$ and $C_2$ of each said coil, the spacing between said coils being such that one of images $I_1$ and $I_2$ of one coil is coindicent with the other of those images of the other coil, a picture carrier located adjacent to said Fresnel condensor, an objective, said picture carrier being arranged in the object plane of said objective, a diaphragm being provided in said objective, said diaphragm being adapted to pass substantially only light producing said coincident images, and being arranged substantially in the image side focal plane of said Fresnel condensor, and a projection table being located in the image plane of said objective, said image plane being optically conjugated to the object plane of said objective, whereby said condensor is constituted as means producing a substantially achromatic image.

4. A projection device of wide angular field of lens, comprising in sequence along and in alignment with an optical axis, a light source for emitting a bundle of white light symmetrically about said optical axis, a Fresnel condensor, said Fresnel condensor including two Fresnel lenses, said light source being located in the object plane of said Fresnel condensor and having a coil the axis of which is substantially parallel with said optical axis, the width of said coil being such that said condensor is constituted as means producing images $I_{S1}$ and $I_{S2}$ of a region of the coil spaced from said axis for spectral color $C_1$ and $C_2$ respectively and images $I_{A1}$ and $I_{A2}$ of a region of said coil on said axis for spectral colors $C_1$ and $C_2$, respectively, images $I_{A1}$ and $I_{S2}$ being coincident whereby said condensor is constituted as means producing a substantially achromatic image, a picture carrier located adjacent to said Fresnel condensor, an objective, said picture carrier being arranged in the object plane of said objective, a diaphragm being provided in said objective, said diaphragm being adapted to pass only light producing said coincident images, and being arranged substantially in the image side focal plane of said Fresnel condensor, and a projection table being located in the image plane of said objective, said image plane being optically conjugated to the object plane of said objective.

5. A projection device as claimed in claim 4, wherein the coil is of conical shape and the apex of the cone is closer to said Fresnel condensor than is the base thereof.

6. A projection device of wide angular field of lens, comprising in sequence along and in alignment with an optical axis, a light source for emitting a bundle of white light symmetrically about said optical axis, a Fresnel condensor, said Fresnel condensor including two Fresnel lenses, said light source being arranged in the image plane of said Fresnel condensor and having a coil at right angles to the optical axis and a reflector, said coil and said reflector each constituting a light emitting source, said condensor being constituted as means producing images $I_{F1}$ and $I_{F2}$ for spectral color $C_1$ and $C_2$ of said coil and images $I_{R1}$ and $I_{R2}$ of the light emitting source constituted by said reflector for spectral colors $C_1$ and $C_2$, images $I_{C1}$ and $I_{R2}$ being coincident whereby said condensor is constituted as means producing a substantially achromatic image, a picture carrier located adjacent to said Fresnel condensor, an objective, said picture carrier being arranged in the object plane of said objective, a diaphragm being provided in said objective, said diaphragm being adapted to pass substantially only light constituting said achromatic image and being arranged substantially in the image side focal plane of said Fresnel condensor, and a projection table being located in the image plane of said objective, said image plane being optically conjugated to the object plane of said objective.

* * * * *